Patented Dec. 25, 1928.

1,696,374

UNITED STATES PATENT OFFICE.

CARL ALEXANDER AGTHE, OF ZURICH, SWITZERLAND, ASSIGNOR TO THE FIRM J. R. GEIGY S. A., OF BASEL, SWITZERLAND.

MANUFACTURE OF DISPERSE SYSTEMS.

No Drawing. Application filed November 22, 1927, Serial No. 235,124, and in Germany April 19, 1926.

Sulphite cellulose lye and colloidal silica are known emulsifying agents. Each of them, however, has only a limited application with reference to the number of liquids or molten substances which can be emulsified or finely distributed by its aid.

This invention is based on the discovery that a mixture of sulphite cellulose lye and colloidal silica, which latter may be conveniently made by acidifying water-glass solution, constitutes a remarkable emulsifying agent and protective colloid for numerous materials which are insoluble or sparingly soluble in water. For example, fish oil cannot be made into a permanent emulsion with aid of either sulphite cellulose lye or colloidal silica, whereas this oil can be easily emulsified with a mixture of sulphite cellulose lye and colloidal silica. So also derivatives of mineral oil, such as bitumen and heavy petroleum, distillation products from coal or brown coal, such as pitch or cresol, can be emulsified with aid of a mixture of sulphite cellulose lye and colloidal silica, as well as fish oil and other oils.

Although many emulsifying agents for making disperse systems are known, the number available for making emulsions of neutral or acid reaction is small. A particular advantage of a mixture of sulphite cellulose lye and colloidal silica resides in the fact that the mixture is capable of producing emulsions and other disperse systems of neutral or even acid reaction.

The following examples illustrate the invention:

*Example 1.*—2 kilos of ordinary commercial water-glass of about 40° Bé. are diluted with 48 kilos of water and neutralized with hydrochloric acid. The solution now contains colloidal silica; it is mixed, while stirring, with 50 kilos of sulphite cellulose lye in the condition in which it is obtained as a waste product of the manufacture of cellulose. In the solution thus obtained 100 kilos of fish oil are emulsified, with aid of a powerful stirrer or some other suitable emulsifying device.

*Example 2.*—The quantity of formic acid required to neutralize 2 kilos of the water-glass referred to in Example 1 is added to a solution of 20 kilos of concentrated sulphite cellulose lye containing about 50 per cent of dry substance in 30 kilos of water. This mixture is then poured, while stirring, into a solution of 2 kilos of water-glass in 48 kilos of water and the whole is emulsified with 100 kilos of fish oil.

The fish oil emulsion thus obtained serves for oiling leather and for this purpose has the advantage that in contact with an acid leather no oil is separated.

*Example 3.*—2.5 kilos of water-glass of 40° Bé. are diluted with 47.5 kilos of water. Into this solution is run, while stirring, a mixture of 40 kilos of concentrated sulphite cellulose lye containing about 50 per cent. of dry substance, 0.3 kilo of formic acid and 29.7 kilos of water. The colloidal silica thus produced, together with the sulphite cellulose lye, is a good emulsifying agent which essentially surpasses in its activity sulphite cellulose lye or colloidal silica when used alone.

What I claim is:—

A manufacture of disperse systems, consisting in mixing the material to be emulsified by dispersion both with sulphite cellulose lye and colloidal silica.

In witness whereof I have hereunto signed my name this 9th day of November, 1927.

CARL ALEXANDER AGTHE.